United States Patent
Durham et al.

(10) Patent No.: US 10,877,897 B2
(45) Date of Patent: Dec. 29, 2020

(54) SYSTEM, APPARATUS AND METHOD FOR MULTI-CACHELINE SMALL OBJECT MEMORY TAGGING

(71) Applicant: Intel Corporation, Santa Clara, CA (US)

(72) Inventors: David M. Durham, Beaverton, OR (US); Ron Gabor, Herzliya (IL); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 76 days.

(21) Appl. No.: 16/205,508

(22) Filed: Nov. 30, 2018

(65) Prior Publication Data
US 2019/0108130 A1    Apr. 11, 2019

Related U.S. Application Data

(60) Provisional application No. 62/754,803, filed on Nov. 2, 2018.

(51) Int. Cl.
*G06F 12/0895* (2016.01)
*G06F 11/10* (2006.01)
(Continued)

(52) U.S. Cl.
CPC ...... *G06F 12/0895* (2013.01); *G06F 11/1064* (2013.01); *G06F 12/0864* (2013.01);
(Continued)

(58) Field of Classification Search
None
See application file for complete search history.

(56) References Cited

U.S. PATENT DOCUMENTS 5,878,245 A * 3/1999 Johnson .............. G06F 9/30043
                                                    711/131
5,893,121 A * 4/1999 Ebrahim ............. G06F 12/0253
(Continued)

OTHER PUBLICATIONS

U.S. Appl. No. 15/939,871, filed Mar. 29, 2018, entitled "System, Apparatus and Method For Providing Key Identifier Information in a Non-Canonical Address Space" by Siddhartha Chhabra, et al.
(Continued)

*Primary Examiner* — Edward J Dudek, Jr.
*Assistant Examiner* — Ralph A Verderamo, III
(74) *Attorney, Agent, or Firm* — Trop, Pruner & Hu, P.C.

(57) ABSTRACT

In one embodiment, a method includes: in response to a sub-cacheline memory access request, receiving a data-line from a memory coupled to a processor; receiving tag information included in metadata associated with the data-line from the memory; determining, in a memory controller, whether a first tag identifier of the tag information matches a tag portion of an address of the memory line associated with the sub-cacheline memory access request, and in response to determining a match, storing a first portion of the data-line associated with the first tag identifier in a cache line of a cache of the processor, the first portion a sub-cacheline width. This method allows data lines stored in memory associated with multiple different tag metadata to be divided into multiple cachelines comprising the sub-cacheline data associated with a particular metadata address tag. Other embodiments are described and claimed.

20 Claims, 8 Drawing Sheets

(51) Int. Cl.
*G06F 12/0864* (2016.01)
*G06F 12/0886* (2016.01)

(52) U.S. Cl.
CPC .. *G06F 12/0886* (2013.01); *G06F 2212/1032* (2013.01); *G06F 2212/1041* (2013.01); *G06F 2212/403* (2013.01)

(56) References Cited

U.S. PATENT DOCUMENTS

| | | | | |
|---|---|---|---|---|
| 6,167,488 | A * | 12/2000 | Koppala | G06F 7/785 710/53 |
| 9,990,249 | B2 | 6/2018 | Durham | |
| 2008/0005504 | A1* | 1/2008 | Barnes | G06F 12/0815 711/156 |
| 2014/0040550 | A1* | 2/2014 | Nale | G06F 12/0804 711/118 |
| 2015/0058997 | A1* | 2/2015 | Lee | G06F 21/6281 726/26 |
| 2015/0089159 | A1* | 3/2015 | Busaba | G06F 12/0817 711/144 |
| 2015/0261683 | A1* | 9/2015 | Hong | G06F 12/0891 711/144 |
| 2017/0285976 | A1 | 10/2017 | Durham | |
| 2017/0371793 | A1* | 12/2017 | Saidi | G06F 12/0868 |
| 2018/0018288 | A1 | 1/2018 | Dewan et al. | |
| 2018/0247082 | A1 | 8/2018 | Durham | |

OTHER PUBLICATIONS

U.S. Appl. No. 15/714,217, filed Sep. 25, 2017, entitled "System, Apparatus and Method for Page Granular,Software Controlled Multiple Key Memory Encryption" by David M. Durham, et al.
U.S. Appl. No. 15/635,548, filed Jun. 28, 2017, entitled "Multi-Key Cryptographic Memory Protection" by Siddhartha Chhabra, et al.
U.S. Appl. No. 16/023,576, filed Jun. 29, 2018, entitled "Low Overhead Integrity Protection With High Availability for Trust Domains" by Siddhartha Chhabra, et al.

* cited by examiner

SYSTEM, APPARATUS AND METHOD FOR MULTI-CACHELINE SMALL OBJECT MEMORY TAGGING

This application claims priority to U.S. Provisional Patent Application No. 62/754,803, filed on Nov. 2, 2018, in the names of David Durham, Ron Gabor, and Rajat Agarwal, entitled "System, Apparatus And Method For Multi-Cacheline Small Object Memory Tagging," the disclosure of which is hereby incorporated by reference.

TECHNICAL FIELD

Embodiments relate to technologies for tagging small objects in memory.

BACKGROUND

Memory tagging works similar to multi-key total memory encryption (MKTME), where physical address bits (or other cached metadata) hold tag bits (e.g., the Key Identifier KeyID or Key Domain). Software may select the tag bits within a linear address space by setting non-canonical bits to the tag value. Hardware can bypass paging structures for these translations, allowing the linear address (LA) to directly set tag bits in the physical address (PA). While such tagging exists, it is only available on a full cacheline width.

DETAILED DESCRIPTION

Figure 1A:
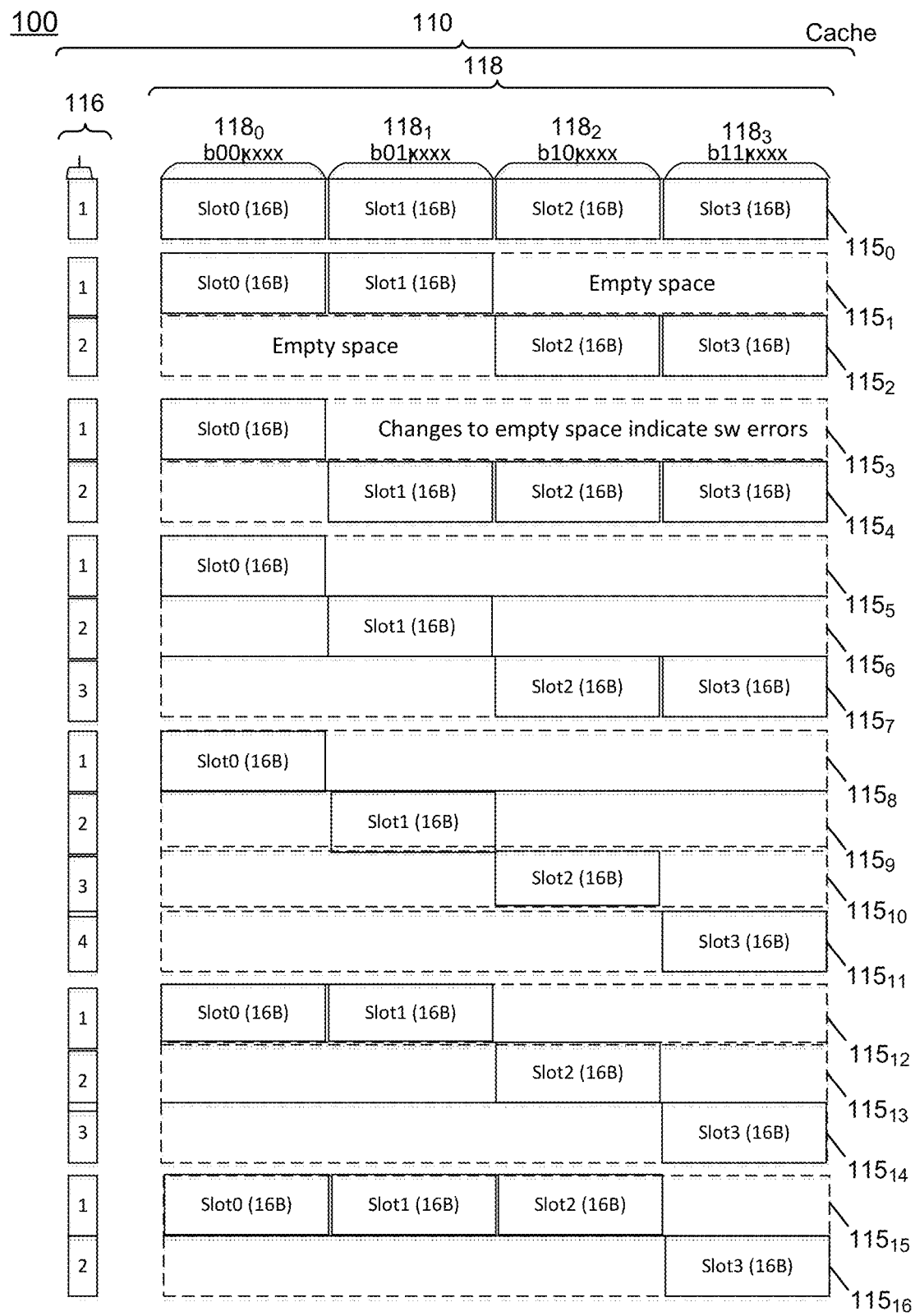
FIGS. 1A-1C are high level views of a number of cachelines in a cache of a processor and corresponding data-lines in a memory in accordance with one embodiment of the present invention.

In various embodiments, techniques are provided to enable memory tagging solutions using, e.g., error correction code (ECC) memory or memory tag tables, with sub-cacheline granularity. An example embodiment for an architecture having 64 byte (B) cacheline widths may provide a minimum 16 B allocation size for memory tagging, without involving hardware of a processor core or other processor. Such sub-cacheline granularity allocations may be individually tagged and monitored for all memory-attached intellectual property (IP) circuits. Additionally, as tag meta-data may be checked between external memory and the processor/IP caches on a load operation, it offers a software side-channel defense mechanism as tags can be checked and validated before cache contents are affected.

Fine grain memory tagging may be realized in embodiments by assigning tagged objects, also referred to herein as data portions or data slots, within a data-line in memory to be replicated across cachelines with different tags in memory. The objects also may be shifted to the end of the cacheline by memory controller/uncore circuitry so that they cause additional cache loads and tag checks on an overflow or underflow (read or write). That is, by shifting the memory contents to the beginning or end of the cacheline, an additional read for any adjacent data will cause a subsequent adjacent cacheline load, allowing the memory controller to first check the tags of the newly loaded cacheline and, thus, detect any potential error due to a tag mismatch given the accessing address. In this way, the core will be "tricked" into detecting sub-cacheline data object overflow, or rather, the CPU core will defer to the memory controller subsystem to check tags. Note that tagging operations described herein may be performed by hardware referred to interchangeably herein as a "memory controller" or "memory tag controller," which more generally refers to memory controller subsystem hardware, potentially located in a variety of locations of a memory subsystem to handle sub-cacheline data tagging as described herein.

In this way, as no additional logic or circuitry is required of the CPU cores, any memory-connected device (e.g., direct memory access (DMA) device), accelerator, integrated graphics processing unit, general purpose graphics processing units (GPGPUs), field programmable gate arrays (FPGAs), etc. whose memory accesses go through the memory controller may similarly have its tagged memory accesses checked at a fine granularity, identifying execution or data access errors from any connected component. Memory tagging can be used to detect software exploits, vulnerabilities, malware, and bugs in code. For example, memory tagging can be used for determining that a pointer is being used after it was freed, overflowing a buffer, or other bounds violations, and a variety of other memory vulnerabilities and exploits even when executed speculatively.

In an embodiment, on a load operation, a memory controller shifts slots with a matching tag to the right hand side of a cacheline. Regardless of 16 B (the data slot) position in the cacheline, if a small object overflows as it is right shifted to the end of its own cacheline, it will go to the next cacheline, causing tag mismatch on the subsequent memory load by the memory controller. In embodiments, (multiple) 4×16 B small objects (data slots) may be provided on the same cacheline as it is stored in memory, aka memory-line, each having a unique tag. When the line is loaded from memory, all 4 16 B objects may be within the same position in a unique cacheline as distinguished by a memory address tag. As such, a memory allocator can distinguish small object location given its tag in an address (as an example, all 4 objects can be allocated at position b11xxxx, at the right hand side of a cacheline, each with a unique tag value). Any combination of slots may be grouped together by using the same memory tag, allowing any size combination of 16 Byte, 32 Byte, 48 Byte or 64 Byte object allocations on a single cacheline as identified by adjacent slots having the same tag value as stored in memory. In this way allocated objects are identified by the combination of their memory address and tag value.

In an embodiment, on a cacheline store operation when a small object indicator is set, the memory controller reads tags from ECC memory and shifts slots back to their original matching tag value locations in the memory-line, only overwriting slots in memory with the matching tag in (e.g., ECC) memory that matches the tag in the address of the store request. If a tag is not found in memory on a memory load or store, one or more of a variety of error notification techniques may occur, such as a poisoned cacheline (setting a poison indicator for the cacheline load or a poison indicator stored in ECC memory for a store), triggering a global observation error (GoError), logging the error, and/or issuing another signal raised by the memory controller to CPU.

In an embodiment, a memory allocator library (e.g., malloc in glibc) chooses tags, knowing that data will be shifted in accordance with the stored memory tags. If each allocation is 16 B on the same line, malloc will set all 16 B objects to address the last slot (LA bits 4 & 5 are set to one), but each is assigned a different tag value. Similarly, any combination of 16 B, 32 B, 48 B or 64 B objects may be specified with appended slots by indicating the same tag value for the adjacent slots in (e.g., ECC) memory. Individual tags can be set or updated in memory via partial writes (e.g., via uncached page mapping) to assign each tag individually according to the tag value in the address that is addressing a particular slot location (e.g., an uncached write to the specific addressed location of the 16 B slot in the memory-line). Contents with old tags are flushed from the cache when tags are re-assigned (e.g., by malloc, new, or similar) or potentially when freed (e.g., by free or similar). In an embodiment, this flushing may be done line-by-line using a cacheline flush CLFLUSH instruction or a CLFLUSHOPT instruction or similar. Each small object with its unique tag is individually flushed so memory contents can be current before a new tag is assigned to the memory location. Other embodiments may simply invalidate any cachelines cached with the reassigned address tag value without actually flushing the cacheline contents back to memory as the data was deleted (or freed) and no longer valid for a program.

Tags may be set in memory by using partial or uncached writes. Each slot in memory can receive an updated tag when an uncached write is used, where the new tag is specified in the physical address (PA). Thus, the memory controller can use uncached writes to determine which tag value (or values) is being updated and overwrite only those tag values corresponding to the memory location (PA) of the partial uncached write. Tags thus may be initially/independently set by using uncached operations (e.g., with a page table entry to specify a memory type of uncached/non-cached PAT for the linear memory write, an MTRR specified uncached memory range, etc.). To set the tag initially, software can access an uncached page mapping for the memory location, the memory controller receives an uncached store request where the physical address also specifies the specific location of the cacheline being updated and the tag value. Such uncached writes are not a cacheline granular write as they bypass the caches and instead address specific memory locations. In this case, the memory controller may first load/read the full cacheline from memory, and update the specific portion being written (just the specifically addressed slots with the new data) and also overwrite the tag(s) for those slots in ECC memory given the tag in the PA. Note embodiments can control what software can perform uncached writes though, e.g. protection keys or user/supervisory mappings as set in page table permissions. Other embodiments may use special (secret) 16 byte data values that indicate the location of empty space on the cacheline. In such embodiments, software will set the secret data value for the portions of the cacheline not occupied by the sub-cacheline data and then write (store) the line to memory using the associated address tag. The memory controller will detect the special (secret) value set by the software on memory allocation to indicate which region of the cacheline is not covered (or inversely, is covered) by the tag value in the address and then set the tag value(s) for the remaining portion of the cacheline in memory. This special cacheline data value may be kept secret from other software so that only the memory allocation library routines or other privileged software know the special value as well as the memory controller hardware and, thus, prevent an adversary from changing configured tag values. Other embodiments may simply have tags in memory mapped tables or make tags configurable through a memory tag controller device interface.

Zero tags or special values may be set on initialization. These values may allow any tag value in the PA to match without triggering any errors. Special tag values may also be allowed in the PA to match any tag value without triggering an error. These special tags may be used with special KeyID values indicating privileged software (e.g., OS kernel/VMM) or memory protection keyed (MPK) regions are being used to access tagged memory data. Tags may be read back from memory using special device transitions (e.g., MMIO) to read out ECC (or tag table) memory contents, or partial reads (non-cached/uncached memory reads) may be used to identify transactions where memory is not being read but the ECC (or memory table) tag contents are read. For example, setting a small object indicator bit on a partial/uncached read may default to send back the tag (or tags) corresponding to the slot address being read. Also, a specific KeyID value or special tag value in the memory address may be used to identify when tags are to be returned instead of normal memory contents for an addressed memory location (slot location). In this way, the current tag values set in memory may be recovered by software, or used by the OS for paging in and out pages from memory while also saving and restoring the assigned tag values.

Figure 1B:
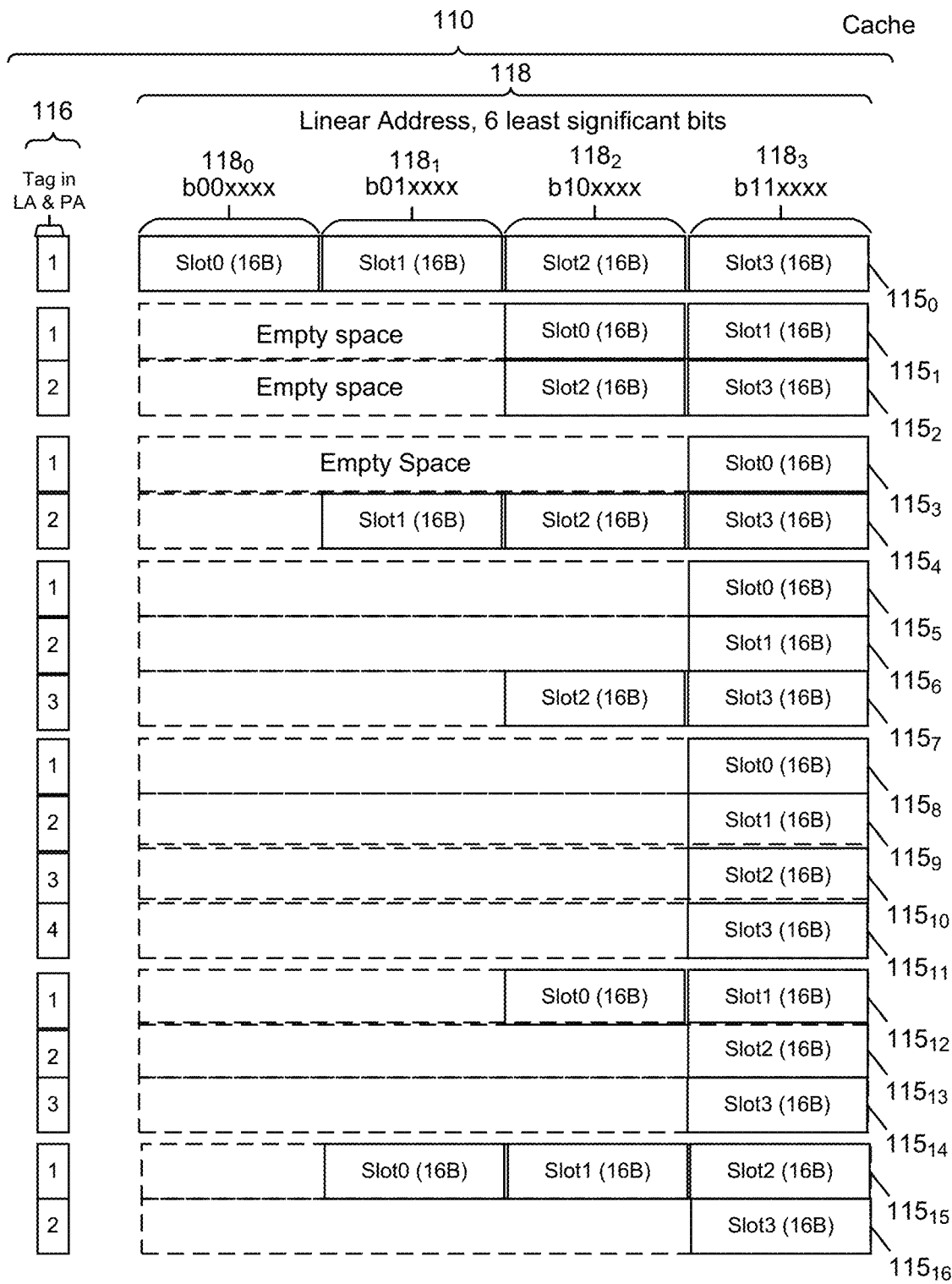
Figure 1C:
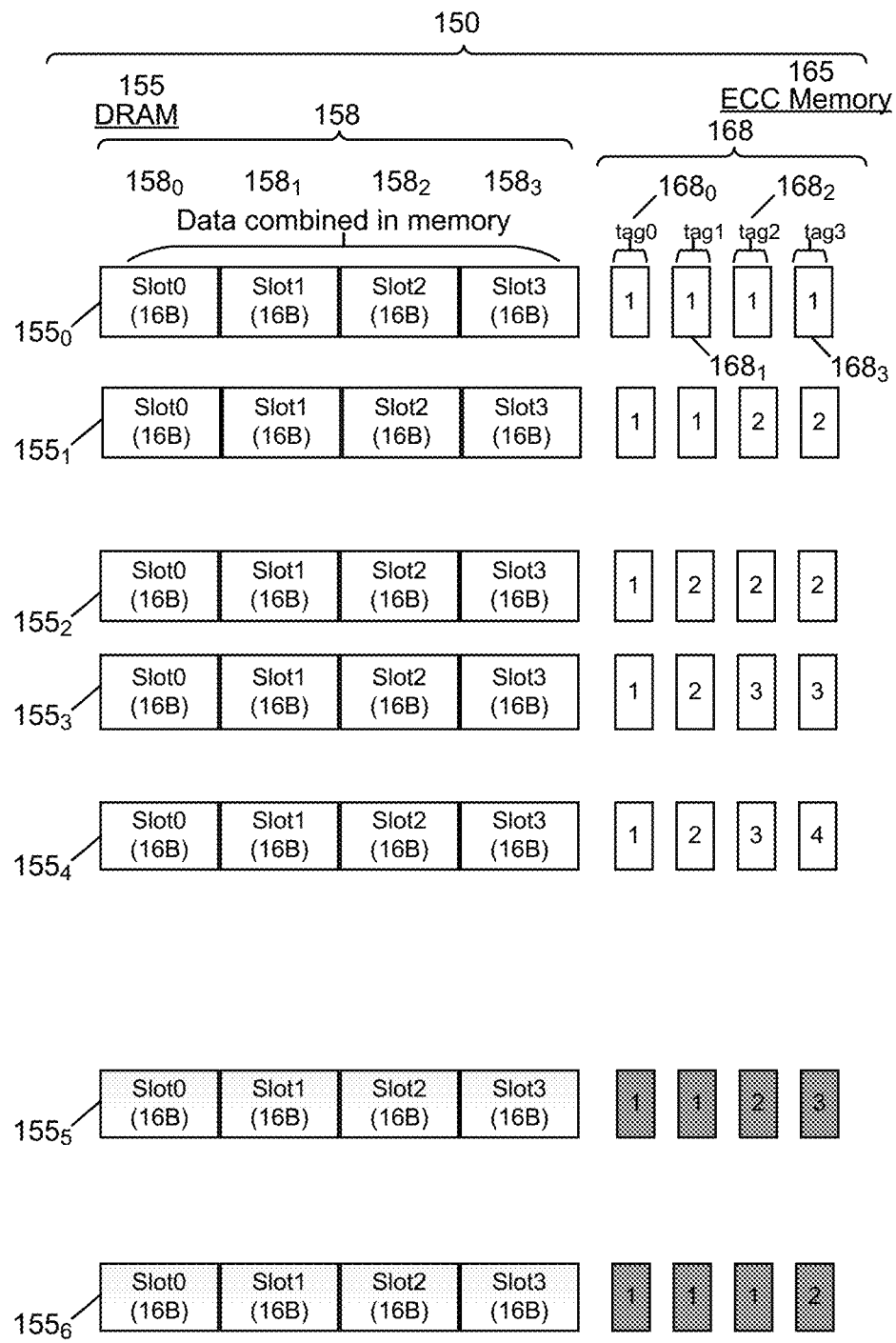

Referring now to FIGS. 1A-1C, shown is a high level view of a number of cachelines $115_0$-$115_{16}$ in a cache 110 of a processor and corresponding data-lines $155_0$-$155_6$ in a memory 150. As illustrated in FIG. 1C, memory 150 includes different portions, including DRAM 155 that may store data-lines 155 and an ECC memory 168 that may store metadata associated with each data-line. While different information may be included in such metadata, including ECC data, understand that in embodiments herein, ECC memory 168 may store, for each data-line 155, a plurality of tag identifiers $168_0$-$168_3$. In embodiments herein, each tag identifier 168 is associated with a corresponding slot portion of a data-line 155, namely slot portions $158_0$-$158_3$, which collectively form a full width 158 of a given data-line. In other cases, tag identifiers may be stored elsewhere in a memory, e.g., in a table or in an additional memory burst on load/store operations to retrieve metadata associated with a memory-line.

As illustrated more specifically in FIG. 1A, some cachelines may include a single slot of data corresponding to a tag value. Other cachelines store two slots of data for the same tag value. Still other cachelines may store three slots of data corresponding to the same tag value. Note that the remainder of any given cacheline having less than full data slots may be considered empty space. In the illustration of FIG. 1A, data slots are shown in different slots $118_0$ $118_3$ of multiple cachelines 115 to illustrate how this data logically fits together, as compared to the storage of the same data slots in a single memory data-line 155 in memory 150.

Next referring to FIG. 1B, another illustration of data slots stored in cache 110 is shown. In this example, note that the data slots may be shifted such that single data slots are stored at a right hand side of a given cacheline in slot $118_3$. When multiple data slots are present in a given cacheline, shifting may occur still, with the data slots beginning storage at a right hand side of a given cacheline. Such shifting of data slots to an end of a given cacheline 115 may aid in identifying potential memory violations, e.g., in underflow or overflow situations, as described further herein.

In some embodiments, pad data such as a predetermined pattern may be stored in the empty space to enable detection of potential memory violations. In an embodiment, pad data may be predetermined pattern of either logic zeros or logic ones. Other embodiments may use secret values for the pad set by the memory controller to indicate empty space, with different unique values for 16 B, 32 B or 48 B of empty space that may also be unique per memory address and/or tag value. If such data is changed from the expected value on a store operation, the memory controller can detect that there was an overwrite of the data that went beyond the extent of that small data object in the cacheline (and, thus, indicating an error condition).

Note further in FIG. 1A that each cacheline 115 is associated with a single tag identifier stored in a corresponding tag portion 116. The tag identifier may be part of the memory address associated with a particular cacheline, for example, occupying the most significant address bits which are treated by the memory controller logic as a tag and not used to address external memory. In different embodiments, tag portion 116 may be included in a metadata portion of a given cacheline 115 or it may be stored in a separate but associated cache such as a tag memory. As illustrated, each cacheline 115 can be associated with a given tag 116, e.g., as selected by a memory allocator library. Thus in the specific examples shown, each cacheline may include one or more slots $118_0$-$118_3$ of 16 B each. Each cacheline 115 is associated with a tag identifier and includes one or more 16 B slots.

As examples, a first cacheline $115_0$ may include four slots (slot 0-slot 3) associated with a first tag identifier (1). In an embodiment, the memory allocator library may set all 16 B objects to address a last slot (LA bits 4 and 5 set to 1), each assigned with a different tag. As shown, additional cachelines 115 include one, two or three slots, where each cacheline 115 is associated with one tag identifier. The memory allocator may track which tag values correspond to which slots in memory for a given memory allocation to assure small object data corresponding to different tag values is non-overlapping in the slotted memory.

Note that data of multiple slots can be combined into a single data-line in the memory. More specifically note that given data-lines 155 in FIG. 1B may include data slots from potentially multiple cachelines 115 of cache 110. For example, data-line $155_1$ includes four data slots $158_0$-$158_3$ that include corresponding data slots 118 from cachelines $115_1$, $115_2$. Similar allocations of data slots from multiple cachelines are shown in data-lines $155_2$-$155_6$. As further shown in FIG. 1C, the tag identifiers for a given data-line 155 can be stored in ECC memory 168 where the location of the tag corresponds to the location of the associated data slot in the memory-line. In this way, sub-cacheline data slots can be allocated to a single data-line/memory-line, with different tag identifiers associated with the different slots. For purpose of example, FIGS. 1A and 1B show how multiple cachelines may be combined based on tag value into a single memory line FIG. 1C for the same memory location given the stored tag values and their relative location. Cacheline $115_0$ corresponds to memory-line $155_0$. Cachelines $115_1$ and $115_2$ combine into memory-line $155_1$. Cachelines $115_3$ and $115_4$ combine into memory-line $155_2$. Cachelines $115_5$ through $115_7$ combine into memory-line $155_3$. The four cachelines $115_8$ through $115_{11}$ each with a unique tag value combine into memory-line $155_4$. Cachelines $115_{12}$ through $115_{14}$ combine into memory-line $155_5$. Finally, cachelines $115_{15}$ through $115_{16}$ combine into memory-line $155_6$ in FIG. 1C.

Figure 2:
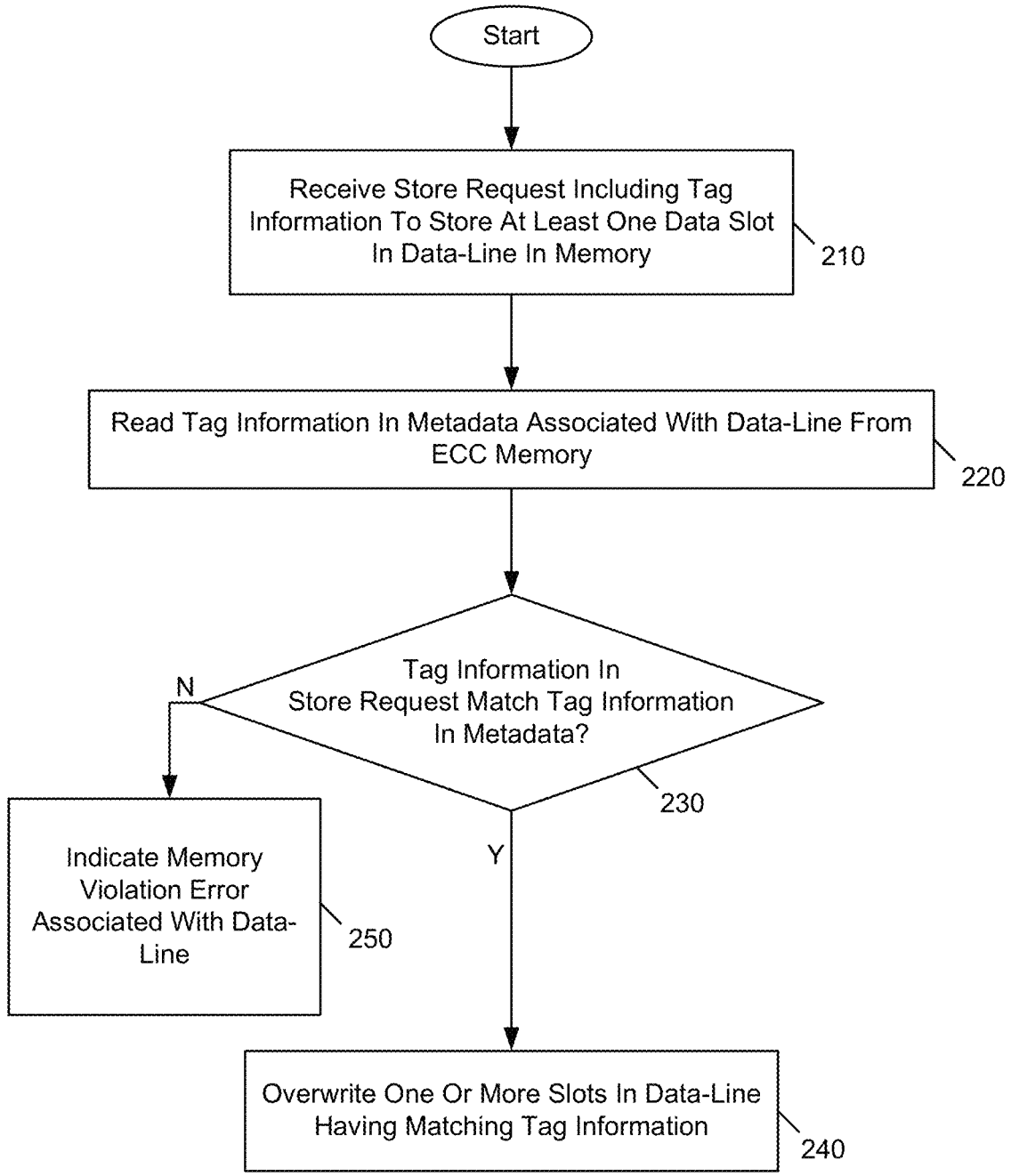
FIG. 2 is a flow diagram of a method for performing a store operation for one or more data slots in accordance with an embodiment.
Figure 3:
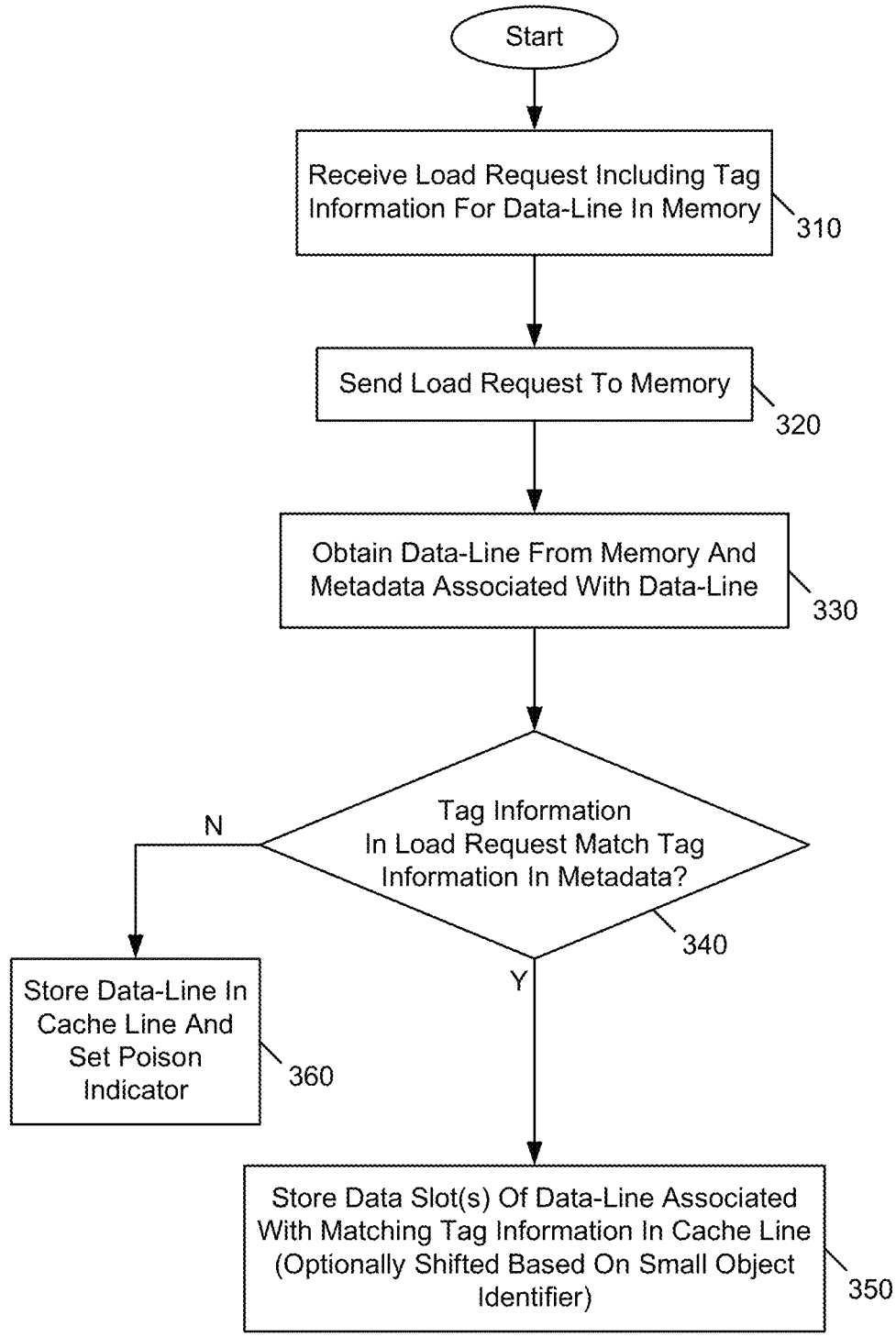
FIG. 3 is a flow diagram of a method in accordance with another embodiment of the present invention.

FIGS. 2 and 3 show high level flow charts for handling store and load operations, e.g., in a memory controller of a processor. Note that by performing such handling operations in the memory controller, no specialized hardware or programming is needed for a core or other processing unit. As such, embodiments may be used to provide sub-cacheline memory tagging for a variety of different processing units. That is, in embodiments a memory controller or other memory execution circuitry of a processor may primarily perform memory access operations for tagged sub-cacheline data slots. As such, embodiments apply not just to software executing on a general-purpose processing core (CPU), but also to GPGPUs, accelerators like FPGAs, or any other kind of direct memory accessing device connected to a system. Understand that the sub-cacheline memory tagging herein may be performed by a memory controller or other component external to a caching fabric, such as an interposer circuit coupled between the processor and memory. Of course in other cases, this functionality could be located between any of the caching layers, e.g., between a level two (L2) cache and a last level cache (LLC).

Referring now to FIG. 2, shown is a flow diagram of a method for performing a store operation for one or more data slots in accordance with an embodiment. Method 200, in an embodiment, may be performed by a memory controller or other memory execution circuitry. As such, method 200 may be performed by hardware circuitry, firmware, software, and/or combinations thereof.

As illustrated, method 200 begins by the memory controller receiving a store request including tag information to store data in a data-line in memory (block 210). Such request may be received from any type of processing unit including core, GPU, FPGA or so forth. This store request, in an embodiment, may include the data to be written to memory. Assume for purposes of discussion a single data slot is to be written, along with tag information, namely a tag identifier for this data slot, which may be included in a non-canonical portion of an address of the store request (a portion of the address used to carry the tag information). Next, at block 220 the memory controller may read tags associated with the data-line for the address from ECC memory. Note that in embodiments, where the small object bit is not set, in the case of a store operation, there is no need to read tags from memory before writing. For example, some embodiments may determine that the memory contents were previously loaded into cache and tags were checked before the cacheline's data was modified (for example a "loaded bit" could be set with the cacheline in cache when the cacheline was previously loaded from memory, and not set if the line were a direct write without a read for ownership). Such embodiments could then directly store such a non-poisoned, modified cacheline directly back to memory without needing to again load and check the tags as the tags would have been checked on the original load operation for the full cacheline. Then at diamond 230, it is determined whether in these tags, a matching tag value to the tag of the address (PA) associated with the write request is found. If so, at block 240 for the number of slots to be written having the same tag (in this example, tag value one), a shift operation may be performed to shift left until the data slot with the first tag is copied to the first tag position. As such, a write operation may be performed in which any slots with a matching tag value are overwritten in the data-line at the slot positions corresponding to the matching tag value.

Thus in the case of a cached write/store, the memory controller seeks to find matching tags by first reading the line from memory (including the tags from ECC memory). If it finds a matching tag, it will just overwrite the data slots in memory corresponding to that same tag value. If no matching tag values are found for the line, then the memory controller will not overwrite the data (nor tags) and instead indicate an error back to the requester (e.g., core) (block 250). This error notification may be an indication of some type of memory violation. In embodiments, this error notification may be in the form of an interrupt from the memory controller to the core, an exception, GoError, log entry or such to indicate which address/tag failed to write. The memory controller may also update a poison indicator stored in ECC memory (which can likewise indicate the attempted incorrect write when the line is subsequently re-read/loaded from memory).

Referring now to FIG. 3, shown is a flow diagram of a method in accordance with another embodiment of the present invention. More specifically, method 300 is a method for performing a load operation. Method 300, in an embodiment, may be performed by a memory controller or other memory execution circuitry. As such, method 300 may be performed by hardware circuitry, firmware, software, and/or combinations thereof.

As illustrated, method 300 begins by receiving a load request including tag information for a data-line in memory (block 310). This load request may be a request from any given component to read at least one data slot from a data-line. In embodiments herein this data request may include a tag identifier included in a non-canonical portion of an address of the load request. In response to this load request, the memory controller sends the load request to memory (block 320). For this load operation, the memory controller may receive the tags included in metadata associated with the memory-line along with the data for the requested address from memory (memory-line) (block 330). Then the memory controller may determine whether one or more tags of the tag information matches a tag of the address of the memory request (diamond 340). If so, one or more portions, e.g., data slots, may be stored in a cacheline, along with storing the tag identifier itself, e.g., in metadata of the cacheline.

In some embodiments, such one or more data slots may be optionally shifted based on a small object identifier and matching tag values, e.g., a small object bit included in the address of the load request. In such embodiments, data slots may be shifted right with the same tag value until the slot with the first (first from the right) matching tag is copied into the right hand side of position of the cacheline. Thereafter, this reformatted cacheline may be sent to the cache with the corresponding tag still specified in the address. Note that if a matching tag is not found on a load, control passes to block 360 where the cacheline may be poisoned, e.g., by setting a poison indicator associated with the cacheline, such as setting a poison bit for the cacheline.

Figure 4:
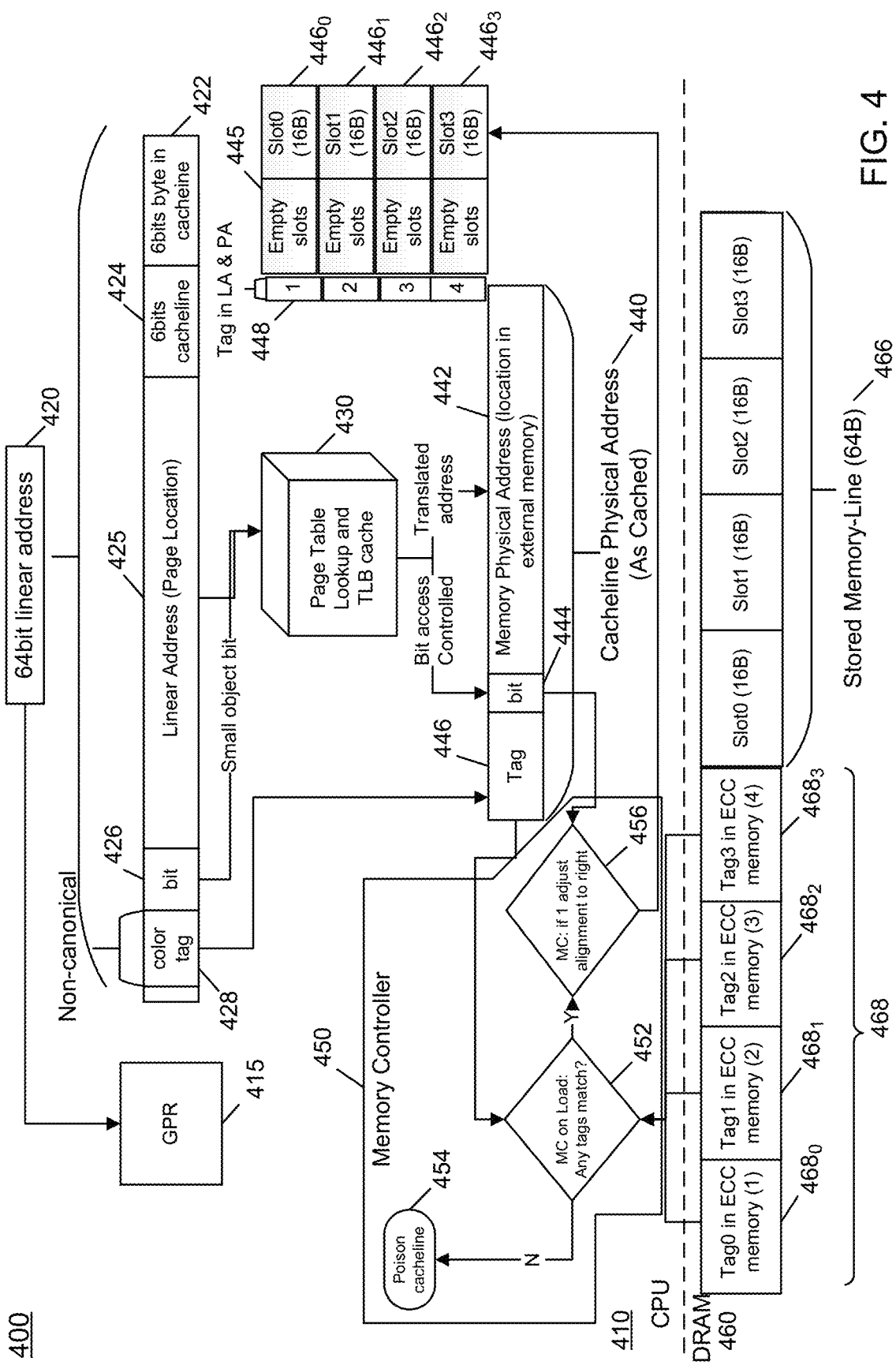
FIG. 4 is block diagram of a high level arrangement of a system including a processor and an associated memory in accordance with an embodiment of the present invention.

Referring now to FIG. 4, shown is a high level arrangement of a system 400 including a processor (CPU) 410 and an associated memory (DRAM) 460. As illustrated, assume a load or read request is generated. Software may request data to be read using a 64-bit linear address 420 which, as shown, includes various portions including a least significant portion 422 (e.g., 6 bits to identify a byte within a cacheline), another portion 424 to identify a cacheline, a linear address portion 425 to identify a page location, and a small object indicator 426, e.g., a small object bit, which when set identifies that the request is for less than a cacheline width. For example, this small object address bit may be set by page table entries corresponding to pages that are part of a small object region of a heap. As further illustrated, a non-canonical portion of the address may include a tag 428 as described herein. Note that linear address portion 425 may be used to perform a lookup within page table and TLB caching structures 430 to obtain a memory physical address 442. Assume that this physical address corresponds to memory-line 466 also shown in FIG. 4, which includes four 16 B slots (slot 0-slot 3) each having a corresponding tag $468_{0-3}$ stored in ECC (or a table in) memory 468.

When each of these stored tags is of a different tag identifier value, this means that each slot is associated with a different tag and thus as further illustrated in FIG. 4, when loaded and stored into a cache 445, each slot may be stored into a different cacheline (e.g., in a right hand side of the cacheline as shown), with its corresponding tag identifier 448 in the PA address for the cacheline. Thus as illustrated in FIG. 4, with tag identifiers $468_0$-$468_3$ each including a different value (namely values 1-4), each corresponding data slot in memory-line 466 may be stored in a different cacheline 446, each stored in association with its corresponding tag identifier in an address or metadata portion of cache 445 associated with the cacheline.

As further illustrated, memory controller operations to be performed on a load are shown. Of course in other cases, this (memory tag controller) functionality could be performed between any of the caching layers, e.g., between the L2 cache and LLC, or between the L1 and L2 cache, and so on. As seen, a memory controller 450 may determine whether the tag of the address matches any of the identified tags in the tag information obtained from memory (diamond 452). If so, it may also be determined whether the small address object indicator is set (diamond 456). If it is, memory controller 450 may cause the data slot associated with the matching tag to be stored in a given cacheline aligned to the right hand side as illustrated. Data shifting in a cacheline with out-of-bounds detection can occur when the next byte to be read or written goes beyond the end of the cacheline. And note that data can be aligned/shifted either to the beginning or end of the cacheline depending on whether one wishes to catch an underflow read or an overflow read error. Depending on use cases, data slots may be shifted to one end or the other. For example, for a stack usage, shifts may be to the most significant side. If there is an overflow by pushing all the data to the end of the cacheline, a buffer overflow can be detected on a byte granularity because one more byte is walked beyond the end of the buffer, and another cacheline is read. When this subsequent adjacent cacheline read occurs, it is provided to the memory controller for the adjacent cache line, which determines that the tag does not match that last one, thus detecting the violation. Which direction the shifts occur for a particular cacheline may be configured as part of the tag configuration stored in (e.g., ECC) memory or, alternatively, may be indicated by another address bit akin to the small object indictor bit indicating the expected direction of the shift operations.

Note that if there is no match between the tag of the address and any of the tag identifiers received from the memory on a memory load, memory controller 450 may set a poison indicator for the cacheline, to indicate potential memory violation (block 454).

Figure 5:
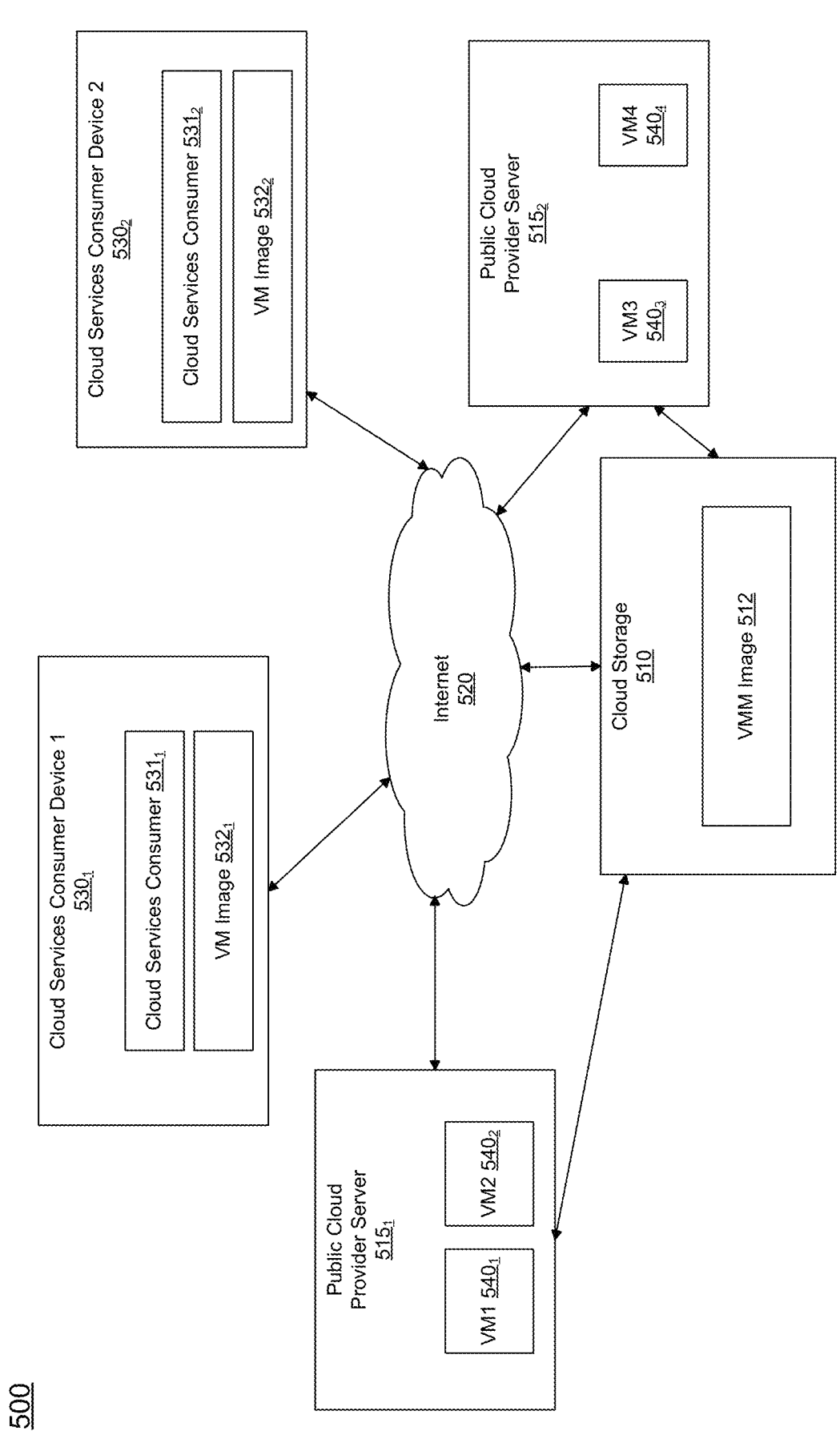
FIG. 5 is a block diagram of a cloud services environment in accordance with an embodiment of the present invention.

Referring now to FIG. 5, shown is a block diagram of a cloud services environment in accordance with an embodiment of the present invention. As shown in FIG. 5, network 500 can be used to allow consumers to request services, including virtualization services, from a public cloud services provider. As seen, network 500 can correspond to any type of communications network and can include many different types of computing devices interconnected via a given network such as Internet 520. And in embodiments herein, in a cloud services environment, users may perform memory tagging on sub-cacheline sized data.

Cloud storage 510 can be provided as part of a data center that includes various computing devices, storage devices and so forth. As one example, cloud storage 510 can be a storage device that includes multiple storage components such as disks, optical, or semiconductor-based storage. Cloud storage 510 can act, for example, as a repository of master copies of various applications, including a VMM application that instantiates virtual machines to provide services in response to a consumer's request. In the embodiment shown in FIG. 5, a master copy of a VMM application is stored in the form of VMM image 512. VMM image 512 is a software image containing a software stack designed to provide a virtual machine platform in the form of a VMM.

Thus as further seen in FIG. 5, at the same location, e.g., as part of the same data center, one or more public cloud services provider servers, such as public cloud provider servers 515$_1$ and 515$_2$ can be coupled to cloud storage 510. In various embodiments, public cloud services provider servers can be used to service consumer services requests, including virtualization requests. For example, each public cloud services provider server may host one or more virtual machines on behalf of a consumer. In the example shown in FIG. 5, public cloud provider server 515$_1$ hosts two virtual machines, VM1 540$_1$ and VM2 540$_2$. Similarly, public cloud provider server 515$_2$ hosts two virtual machines, VM1 540$_3$ and VM2 540$_4$. VMs 540 may issue memory requests with linear addresses including sub-cacheline memory tags and small object identifiers as described herein. To this end, in embodiments, such memory requests may enable storage of sub-cacheline data having multiple different tags in single data-line within memories present in public cloud provider servers 515$_1$-515$_2$, as examples.

As shown in FIG. 5, various consumer devices can be present, e.g., cloud services consumer devices 530$_1$ and 530$_2$. Such cloud services consumer devices may be personal devices of a given user such as a smartphone, tablet computer, desktop computer or so forth. Alternatively, cloud services consumer devices may be servers for an organization that consumes cloud services. In addition, cloud services consumer devices may be emulated via software. Similarly, sub-cacheline memory tagging and storage may occur within cloud services consumer devices 530$_1$, 530$_2$ as in public cloud provider servers 515.

Each of cloud services consumer devices 530$_1$ and 530$_2$ provides a respective cloud services consumer 531$_1$ and 531$_2$ and a respective VM image 532$_1$ and 532$_2$. Cloud services consumers 531$_1$ and 531$_2$ may be, for example, a client component of a cloud services application used to request cloud services. VM images 532$_1$ and 532$_2$ may be stored in storage (not shown) coupled to the respective cloud services consumer devices 530$_1$ and 530$_2$. These VM images are provided by the consumer to the cloud services provider and used to create a secure VM, such as VM1 540$_1$, running on the cloud provider's server 515$_1$.

In embodiments herein, VMs 540 may issue memory requests having linear addresses including sub-cacheline memory tags and small object identifiers as described herein. In turn, when accessing memory, a given memory execution circuit of one of servers 515 and/or consumer devices 530 may use this information in determining whether to permit sub-cacheline access to the requested memory location. Understand while shown at this high level in the embodiment of FIG. 5, many variations and alternatives are possible.

Figure 6:
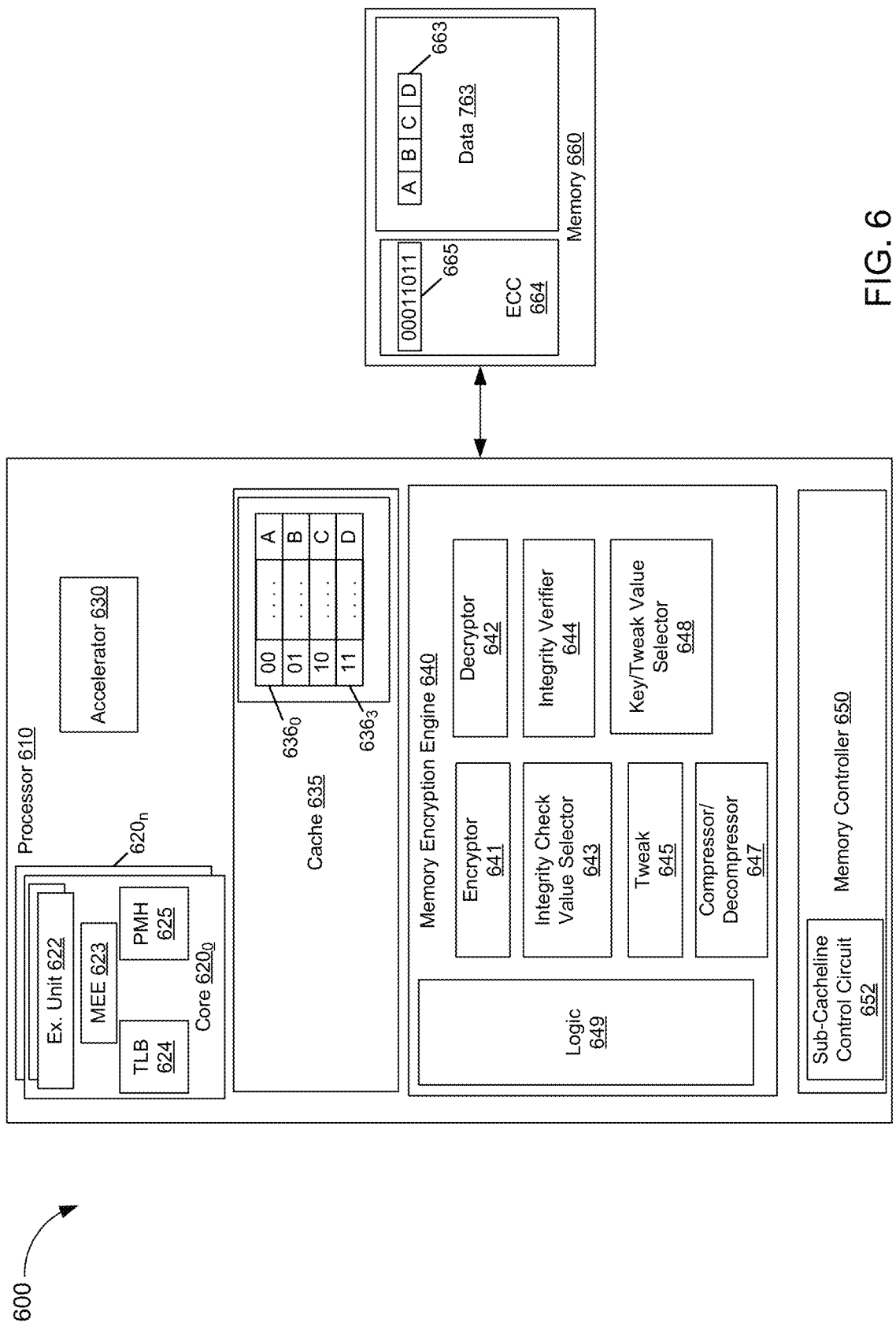
FIG. 6 is a diagram showing an apparatus in accordance with one embodiment of the invention.

FIG. 6 is a diagram showing an apparatus in accordance with one embodiment of the invention, which may be an apparatus 600 to secure a public cloud environment according to an embodiment. Apparatus 600 may include any computing device and/or data platform such as a laptop, personal digital assistant (PDA), media content player, imaging device, mobile Internet device (MID), any smart device such as a wireless smart phone, smart tablet, smart TV, computer server, and so on, or combinations thereof.

Apparatus 600 includes a memory 660. Memory 660 may be external to a processor 610 (e.g., external memory), and/or may be coupled to processor 610 by, for example, a memory bus. In addition, memory 660 may be implemented as main memory. Memory 660 may include, for example, volatile memory such as DRAM, non-volatile memory, and so on, or combinations thereof. As illustrated in FIG. 6, memory 660 may more particularly include separate portions, namely a data portion 662 and an ECC portion 664. In embodiments, these different portions may be implemented in different DRAM chips of one or more DIMMs, or additional memory bursts on a load/store operation. For illustration of sub-cacheline memory tagging as described herein, note that a given data-line 663 of data portion 662 includes a plurality of small objects, namely small objects or data slots A-D which, in a representative embodiment, each may be 16 B wide. Although each of these data slots is present in a single data-line 663, note that each is associated with a different tag identifier present in a corresponding metadata portion 665 of ECC portion 664. These tag identifiers may be stored contiguously, and correspond to tag identifier values of 0-3 (represented in binary form in FIG. 6).

In an embodiment, memory 660 may be protected using encryption and/or integrity checking. In one embodiment, an encryption technique called a tweakable block cipher is used. A tweakable block cipher accepts a second input, called a tweak, along with plaintext or ciphertext input to be encrypted. The tweak, along with the key, selects the permutation computed by the cipher. For example, a tweak function may use a physical memory address as a tweak to a block cipher to bind unencrypted data with the physical memory address. A tweak function 645 may include, for example, XTS (XOR-encrypt-XOR)/XEX-based tweaked codebook mode with ciphertext stealing) algorithm, Liskov, Rivest, and Wagner (LRW) algorithm, and so on, or combinations thereof. Given that an AES block size is 16 B, each slot in a memory-line may be XTS encrypted including its associated tag value as part of the tweak, thus allowing sub-cacheline memory encryption (e.g., Multi-Key Total Memory Encryption (MKTME)).

Processor 610 may include any type of processor such as, for example, micro-processor, an embedded processor, a digital signal processor (DSP), a central processing unit (CPU), a graphical processing unit (GPU), a visual processing unit (VPU), a network processor, FPGA, a device to execute code to implement the technologies described herein, and so on, or combinations thereof. Processor 610 may include one or more cores 620$_0$-620$_n$. Cores 620 may include single-threaded cores, multithreaded cores including more than one hardware thread context (or "logical processor") per core, and so on, or combinations thereof. Cores 620 may include an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

As further illustrated, processor 610 also may include at least one accelerator 630. In different embodiments, accelerator 630 may be a GPU, FPGA or any other type of acceleration circuitry or specialized function unit. And as described herein, accelerator 630, along with cores 620, may leverage sub-cacheline memory tagging capabilities, without using any specialized hardware internal to the core/accelerator.

Representative details of core 620 are illustrated. Understand that core 630 and/or other present cores may include similar circuitry. As seen, core 620 includes one or more execution units 622 such as floating point and/or vector execution units. In addition, core 620 includes a memory execution engine 623 which may perform operations as described herein, in some embodiments.

In any event as further illustrated in FIG. 6, core 620 includes a TLB 624. In various embodiments, TLB 624 includes entries each having a translation from a linear address to a physical address. In some embodiments entries within TLB 624 also may include a small object identifier. Some embodiments may include tags in the page table entries as well. Embodiments may allow tags in the linear address to bypass paging entirely and directly set the corresponding tag values in the corresponding translated physical address. A page miss handler 625 may, when a translation for a given linear address is not included in TLB 624, perform a page walk of page tables (which may be stored in memory 660) to obtain a physical address.

Processor 610 may include internal storage such as, for example, a processor cache 635 including one or more levels to store data (e.g., instructions, operands, program data, etc.) utilized by one or more components of processor 610. Cache 635 may not be encrypted and/or may share a same die as processor 610, on the same chip. In addition, the processor cache may be integrated onto one or more of cores 620 or accelerator 630, as described above. Processor 610 includes a cache 635. Cache 635 may include any type of cache such as, for example, an instruction cache, a data cache, a single level cache, a multi-level cache, a shared cache, a strictly inclusive cache, an exclusive cache, and so on, or combinations thereof. For example, the cache 635 may include a mid-level cache, such as level 2 (L2), level 3 (L3), level 4 (L4), or other levels of cache, a last level cache (LLC), and so on, or combinations thereof. Cores 620, accelerators 630 may check whether data is located in cache 635 to execute one or more instructions and/or other data (e.g., program data, etc.), where a cache miss may cause a transfer of the data from memory 660 to cache 613.

As shown in FIG. 6, for corresponding data-line 663, cache 635 may store a plurality of cachelines $636_0$-$636_3$. As such, each small object from this single data-line is stored in its own cacheline, along with its corresponding tag identifier (which may be stored in a metadata portion of the cacheline and/or in a separate tag portion of cache 635).

Each core 620 and accelerator 630 may be, for example, coupled with respective memory via a respective memory controller such as a memory controller 650, coupled with shared memory via a shared memory controller, coupled with respective memory via a shared memory controller, and so on, or combinations thereof.

As shown in FIG. 6, memory controller 650 includes a sub-cacheline control circuit 652 which may be configured to perform load and store operations on a sub-cacheline basis. Further, as described herein sub-cacheline control circuit 652 may be configured to handle memory tagging of such sub-cacheline accesses, to enable storage and retrieval of tag information associated with given sub-cacheline data slots and to determine memory or other access violations by leveraging the memory tagging on a sub-cacheline basis.

In addition, a shared cache may be coupled with a shared memory controller, a plurality of caches may be coupled with a plurality of respective memory controllers, and so on, and combinations thereof. For example, memory controller 650 may be shared among cores 620 and accelerator 630, may be coupled with cache 635 (e.g., shared multilevel cache), and may couple cores 620 and accelerator 630 with memory 660 (e.g., shared DRAM). The memory controller 650 may be coupled with memory 660 (e.g., external memory, DRAM, etc.).

Processor 610 also includes a memory encryption engine 640. Understand that while shown separately from memory controller 650, in embodiments a memory execution circuit may include the functionality of both memory encryption engine 640 and memory controller 650. The illustrated memory encryption engine 640 includes an encryptor 641, which may encrypt unencrypted data. The unencrypted data may include, for example, cleartext data, plaintext data, and so on, or combinations thereof.

Encryptor 641 may include any type of cipher to generate ciphertext data such as, for example, a block cipher in any desired mode of operation. The block cipher may include a fixed block size, wherein the block cipher may be repeatedly implemented to encrypt data larger than the block size. For example, the block cipher may include Advanced Encryption Standard (AES) in a propagating cipher-block chaining (PCBC) mode of operation. In addition, the block cipher may include an expandable block size.

Memory encryption engine 640 also includes a decryptor 642, which may decrypt ciphertext data to generate unencrypted data. Decryptor 642 may include an inverse of encryptor 641. For example decryptor 642 may include an inverse of AES-PCBC.

Memory encryption engine 640 may read an encrypted data line and decryptor 642 may decrypt the encrypted data line, where the decrypted data line identifies the data line physical address, the integrity line index and the integrity line slot selector for the decrypted data line. A comparator (e.g., integrity verifier 644) may identify no match between the integrity line slot value stored and the key domain selector of the data physical memory address for the decrypted data line, and memory encryption engine 640 and/or comparator, responsive to the no match identification, may cause memory encryption engine 640 or a component thereof to flush the cache line, and report the no match condition as one or more of an error or a fault. Memory encryption engine 640 may also include a compressor/decompressor 647 to compress/decompress the data line bytes.

Memory encryption engine 640 may further include a key/tweak value selector 648 to select a key from a plurality of keys (e.g., a key domain) and/or a tweak from a plurality of tweaks (e.g., a tweak domain) for a physical location in memory 660. For example, the illustrated memory encryption engine 640 may include a function detector to determine that a function (e.g., a program, middleware, an operating system, firmware, virtual machine, VMM, OS kernel, etc.) or a part of the function (e.g., part of a program, etc.) is being launched for the first time, or is being given access to a physical location in the memory 660 for the first time. Key/tweak value selector 648 may, in response, select a key and/or a tweak for the physical location in the memory when the function (and/or part thereof) is given access.

Memory encryption engine 640 also includes logic 649, which may utilize components of processor 610 such as, for example, cores 620 and accelerator 630, encryptor 641, decryptor 642, etc., to maintain (e.g., ensure, verify, test, etc.) the security and integrity of memory 660. Although not illustrated in FIG. 6, the apparatus 600 may include other elements on chip with processor 610. For example, processor 610 may include input output (10) control logic integrated with memory encryption engine 640. Additionally, while examples have shown separate components for illustration purposes, it is should be understood that one or more of the components of apparatus 600 may be combined, may reside in the same and/or different physical and/or virtual locations, and so on, or combinations thereof.

Embodiments thus provide the ability to tag memory at sub-cacheline granularity, in a manner that is invisible to cores and other processing units so that they can take advantage of the techniques without any specialized hardware or control.

Embodiments provide a very high performance solution that does not require any additional memory overhead to store tags. Sub-cacheline granularity of memory tagging may be used for detecting memory overruns, buffer overflows, access control and use-after-free vulnerabilities. Sub-cacheline memory tagging in accordance with an embodiment of the present invention flexibly allows any size of memory tag, e.g., in increments of 16 bytes or smaller. Note also that there may be more or fewer tags per cacheline, e.g., 8 tags for 8 byte-sized slots. Also, there may be more or fewer bits per tag (for more or less possible tag values), etc. Embodiments may also apply to other architectures that use different-sized cachelines (e.g., 128 bytes instead of 64 bytes), etc. And by using ECC memory to store the tags, no additional memory needs to be sequestered for memory tagging (holding tags), reducing DRAM usage. Alternatively, embodiments may store tags in tables or separate memory locations (tables) associated with the memory containing the data-lines, and access the tag values using additional memory loads/stores. Other embodiments may add additional bursts to memory load/store operations to load and store tag metadata associated with a memory-line without requiring ECC memory.

The following examples pertain to further embodiments.

In one example, a method comprises: in response to a sub-cacheline memory access request, receiving, in a memory controller of a processor, a data-line from a memory coupled to the processor and tag information included in metadata associated with the data-line; determining, in the memory controller, whether a first tag identifier of the tag information matches a tag portion of an address of the sub-cacheline memory access request; and in response to determining that the first tag identifier matches the tag portion, storing a first portion of the data-line associated with the first tag identifier in a cacheline of a cache of the processor, the first portion comprising a sub-cacheline width.

In an example, the method further comprises: in response to determining that the tag portion of the address of the sub-cacheline memory access request does not match any tag identifier of the tag information, storing at least the first portion of the data-line in the cacheline of the cache; and storing a poison indicator associated with the cacheline to indicate a possible memory violation associated with the cacheline.

In an example, the method further comprises: determining whether a second tag identifier of the tag information matches the tag portion of the address of the sub-cacheline memory access request; and in response to determining that the second tag identifier matches the tag portion, storing a second portion of the data-line associated with the second tag identifier in the cacheline of the cache.

In an example, the method further comprises receiving the data-line in response to a load request sent from the memory controller to the memory based on the sub-cacheline memory access request.

In an example, the method further comprises receiving the tag information in response to the load request, the tag information obtained from an error correction code memory.

In an example, the method further comprises storing the data-line in the cacheline of the cache in response to determining that all of a plurality of tag identifiers of the tag information match the tag portion of the address of the sub-cacheline memory access request.

In an example, the method further comprises sending a partial write request to the memory to cause the memory to store the first portion of the cacheline in the data-line and store the first tag identifier in the metadata.

In an example, the method further comprises storing the first portion of the data-line at a first end of the cacheline, in response to a small object indicator of the address of the sub-cacheline memory access request.

In an example, the method further comprises identifying an overflow in response to a cacheline read for the first portion of the data-line that overflows the cacheline of the cache.

In an example, the method further comprises storing a predetermined value in a remainder of the cacheline.

In an example, the method further comprises identifying a memory violation in response to a read of the cacheline when at least a portion of the remainder of the cacheline is not of the predetermined value.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a processor comprises: at least one core to execute instructions; at least one accelerator to execute instructions; and a memory execution circuit coupled to the at least one core and the at least one accelerator, where the memory execution circuit, in response to a store request to store a first data portion comprising a sub-cacheline width of data and associated with a first tag identifier, is to send an uncached write to a memory coupled to the processor to cause the memory to store the first data portion in a first data-line of the memory and store the first tag identifier in another portion of the memory associated with the first data-line.

In an example, the memory execution circuit is to perform sub-cacheline tagged memory access operations on behalf of the at least one core and the at least one accelerator.

In an example, in response to a load request for the first data portion, the memory execution circuit is to obtain the first data portion and the first tag identifier from the memory.

In an example, the memory execution circuit is to: determine whether the first tag identifier matches a tag portion of an address of the load request; and in response to determining that the first tag identifier matches the tag portion, store the first data portion in a first cacheline of a cache of the processor and store the first tag identifier in a tag portion of the cache.

In an example, in response to an overflow of the first data portion from the first cacheline to another cacheline, the memory execution circuit is to raise an overflow violation.

In an example, the memory execution circuit, in response to a small object indicator of an address of a second store request to store a second data portion comprising a sub-cacheline width of data, is to obtain a plurality of tag identifiers from the another portion of the memory to determine whether a tag portion of the address of the second store request matches one of the plurality of tag identifiers and if so, store the second portion in the first data-line.

In yet another example, a system includes a processor having: at least one core to execute instructions; at least one accelerator to execute instructions; a cache coupled to the at least one core; and a memory controller coupled to the at least one core and the cache. The memory controller may include a sub-cacheline control circuit that: in response to a first sub-cacheline tagged memory access request from the at least one core, is to cause a first tag identifier and a first data portion comprising a sub-cacheline width of data to be sent to a memory to cause the memory to store the first data portion in a first data-line of the memory and store the first tag identifier in a first metadata location associated with the first data-line; and in response to a second sub-cacheline tagged memory access request from the at least one core, is to cause a second tag identifier and a second data portion comprising a sub-cacheline width of data to be sent to the memory to cause the memory to store the second data portion in the first data-line of the memory and store the second tag identifier in the first metadata location associated with the first data-line. The system may further include the memory coupled to the processor, where the memory includes the first data-line to store the first data portion and the second data portion and the first metadata location to store metadata for the first data-line, including the first tag identifier and the second tag identifier.

In an example, the sub-cacheline control circuit is further to perform sub-cacheline tagged memory access requests on behalf of the at least one accelerator.

In an example, in response to a load request for the first data portion, the sub-cacheline control circuit is to obtain the first data portion and the first tag identifier from the memory, determine whether the first tag identifier matches a tag portion of an address of the load request, and in response to determining that the first tag identifier matches the tag portion, store the first data portion in a first cacheline of the cache with the first tag identifier.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer-readable medium having stored thereon instructions, which if performed by a machine cause the machine to perform a method comprising:
   in response to a sub-cacheline read memory access request, receiving, in a memory controller of a processor, a data-line from a memory coupled to the processor and tag information included in metadata associated with the data-line;
   determining, in the memory controller, whether a first tag identifier of the tag information matches a tag portion of an address of the sub-cacheline read memory access request; and
   in response to determining that the first tag identifier matches the tag portion, storing a first portion of the data-line associated with the first tag identifier in a cache line of a cache of the processor, the first portion comprising a sub-cacheline width.

2. The at least one non-transitory computer-readable medium of claim 1, wherein the method further comprises:
   in response to determining that the tag portion of the address of the sub-cacheline read memory access request does not match any tag identifier of the tag information, storing at least the first portion of the data-line in the cache line of the cache; and
   storing a poison indicator associated with the cache line to indicate a possible memory violation associated with the cache line.

3. The at least one non-transitory computer-readable medium of claim 1, wherein the method further comprises:

determining whether a second tag identifier of the tag information matches the tag portion of the address of the sub-cacheline read memory access request; and in response to determining that the second tag identifier matches the tag portion, storing a second portion of the data-line associated with the second tag identifier in the cache line of the cache.

4. The at least one non-transitory computer-readable medium of claim 1, wherein the method further comprises receiving the data-line in response to a load request sent from the memory controller to the memory based on the sub-cacheline read memory access request.

5. The at least one non-transitory computer-readable medium of claim 4, wherein the method further comprises receiving the tag information in response to the load request, the tag information obtained from an error correction code memory.

6. The at least one non-transitory computer-readable medium of claim 1, wherein the method further comprises storing the data-line in the cache line of the cache in response to determining that all of a plurality of tag identifiers of the tag information match the tag portion of the address of the sub-cacheline read memory access request.

7. The at least one non-transitory computer-readable medium of claim 1, wherein the method further comprises sending a partial write request to the memory to cause the memory to store the first portion of the cache line in the data-line and store the first tag identifier in the metadata.

8. The at least one non-transitory computer-readable medium of claim 1, wherein the method further comprises storing the first portion of the data-line at a first end of the cache line, in response to a small object indicator of the address of the sub-cacheline read memory access request.

9. The at least one non-transitory computer-readable medium of claim 8, wherein the method further comprises identifying an overflow in response to a cache line read for the first portion of the data-line that overflows the cache line of the cache.

10. The at least one non-transitory computer-readable medium of claim 8, wherein the method further comprises storing a predetermined value in a remainder of the cache line.

11. The at least one non-transitory computer-readable medium of claim 10, wherein the method further comprises identifying a memory violation in response to a read of the cache line when at least a portion of the remainder of the cache line is not of the predetermined value.

12. A processor comprising:
at least one core to execute instructions;
at least one accelerator to execute instructions; and
a memory execution circuit coupled to the at least one core and the at least one accelerator, wherein the memory execution circuit, in response to a store request to store a first data portion comprising a sub-cache line width of data and associated with a first tag identifier, is to send an uncached write to a memory coupled to the processor to cause the memory to store the first data portion in a first data-line of the memory and store the first tag identifier in another portion of the memory associated with the first data-line.

13. The processor of claim 12, wherein the memory execution circuit is to perform sub-cache line tagged memory access operations on behalf of the at least one core and the at least one accelerator.

14. The processor of claim 12, wherein in response to a load request for the first data portion, the memory execution circuit is to obtain the first data portion and the first tag identifier from the memory.

15. The processor of claim 14, wherein the memory execution circuit is to:
determine whether the first tag identifier matches a tag portion of an address of the load request; and
in response to determining that the first tag identifier matches the tag portion, store the first data portion in a first cacheline of a cache of the processor and store the first tag identifier in a tag portion of the cache.

16. The processor of claim 15, wherein in response to an overflow of the first data portion from the first cacheline to another cache line, the memory execution circuit is to raise an overflow violation.

17. The processor of claim 15, wherein the memory execution circuit, in response to a small object indicator of an address of a second store request to store a second data portion comprising a sub-cacheline width of data, is to obtain a plurality of tag identifiers from the another portion of the memory to determine whether a tag portion of the address of the second store request matches one of the plurality of tag identifiers and if so, store the second portion in the first data-line.

18. A system comprising:
a processor comprising:
at least one core to execute instructions;
at least one accelerator to execute instructions;
a cache coupled to the at least one core; and
a memory controller coupled to the at least one core and the cache, wherein the memory controller comprises a sub-cacheline control circuit that:
in response to a first sub-cacheline tagged memory access request from the at least one core, is to cause a first tag identifier and a first data portion comprising a sub-cacheline width of data to be sent to a memory to cause the memory to store the first data portion in a first data-line of the memory and store the first tag identifier in a first metadata location associated with the first data-line; and
in response to a second sub-cacheline tagged memory access request from the at least one core, is to cause a second tag identifier and a second data portion comprising a sub-cacheline width of data to be sent to the memory to cause the memory to store the second data portion in the first data-line of the memory and store the second tag identifier in the first metadata location associated with the first data-line, the second tag identifier different than the first tag identifier; and
the memory coupled to the processor, wherein the memory includes the first data-line to store the first data portion and the second data portion and the first metadata location to store metadata for the first data-line, including the first tag identifier and the second tag identifier.

19. The system of claim 18, wherein the sub-cacheline control circuit is further to perform sub-cacheline tagged memory access requests on behalf of the at least one accelerator.

20. The system of claim 18, wherein in response to a load request for the first data portion, the sub-cacheline control circuit is to obtain the first data portion and the first tag identifier from the memory, determine whether the first tag identifier matches a tag portion of an address of the load request, and in response to determining that the first tag identifier matches the tag portion, store the first data portion in a first cache line of the cache with the first tag identifier.

* * * * *